April 6, 1954  F. D. SAWYER  2,674,169
IMPLEMENT HITCH GUIDE
Filed Aug. 8, 1952  2 Sheets-Sheet 1
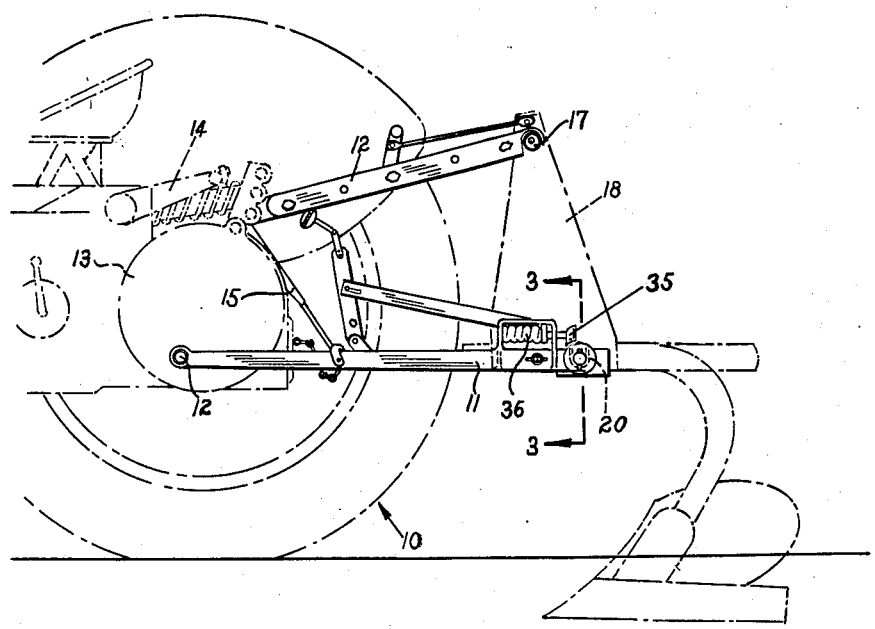
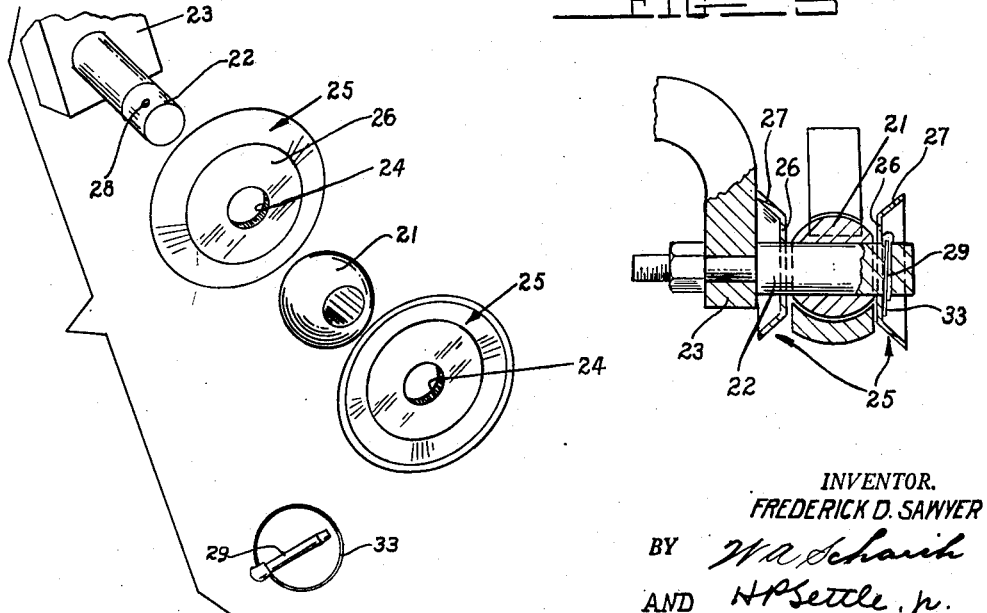
INVENTOR.
FREDERICK D. SAWYER
BY
AND
ATTORNEYS April 6, 1954 F. D. SAWYER 2,674,169
IMPLEMENT HITCH GUIDE
Filed Aug. 8, 1952 2 Sheets-Sheet 2

INVENTOR.
FREDERICK D. SAWYER
BY
AND
ATTORNEYS

Patented Apr. 6, 1954

2,674,169

UNITED STATES PATENT OFFICE 2,674,169

IMPLEMENT HITCH GUIDE

Frederick D. Sawyer, Birmingham, Mich., assignor, by mesne assignments, to Ford Motor Company, Dearborn, Mich., a corporation of Delaware Application August 8, 1952, Serial No. 303,336

5 Claims. (Cl. 97—47.14)

The present invention relates to an implement hitch guide and more particularly to a means for guiding a link element onto a link attachment bearing.

The instant application is a continuation-in-part of my earlier filed application, Serial No. 248,055, filed September 24, 1951, and assigned to the assignee of the present invention.

The present invention provides a simple and readily attachable implement hitch guide which is particularly adapted to direct a self-locking link element onto a link attachment bearing. The link attachment bearing is preferably mounted on an implement A-frame or the like for the reception of rearwardly extending, forwardly converging hitch links mounted on a tractor. The guides, when utilized with self-locking link elements, serve to direct the link elements onto the bearings, so that it is not necessary to manually attach the link elements to the implement, as is necessary in conventional tractor-implement connections of the type having a pair of laterally spaced hitch link elements.

The implement guide of the present invention is quite similar to that of my above identified application in that it includes a generally spherical link attachment bearing positioned upon a laterally extending implement attachment pin between a pair of generally convexo-concave guide plates. The guide plates are retained upon the attachment pin with the attachment bearing therebetween by a linch pin immediately adjacent one of the guide plates and having spring means contacting the adjacent guide plates to urge the plates into contact with the attachment bearing and to accommodate relative lateral spreading movement of the plates. Since the spring urges the plates toward the adjacent bearing, an attachment link abutting one of the plates will cause the plates to spread laterally against spring tension to aid in guiding the attachment links onto the attachment bearings.

It is, therefore, an important object of the present invention to provide an implement-hitch guide having a spring urged guide plate positioned immediately adjacent an implement attachment bearing.

Another object is the provision of an implement hitch guide for directing quick attaching links onto an implement attachment point including a guide plate positioned adjacent the bearing and spring biased toward the bearing.

It is a further object of the present invention to provide means for guiding a link onto a link attachment bearing including a frusto-conical plate positioned immediately adjacent the bearing and retained in position by a linch pin having a retainer spring abutting the guide plate to resiliently bias the same toward the bearing while accommodating limited bearing-plate movement.

Still another important object is the provision of an implement hitch guide including an implement bearing interposed between juxta-positioned guide plates and means urging the plates toward the guide member while resiliently accommodating spreading of the plates to aid in the positioning of the link on the bearing.

The specific nature of this invention, as well as other objects and advantages thereof, will become apparent to those skilled in the art from the following detailed description, taken in conjunction with the attached sheets of drawings on which, by way of preferred example only, are illustrated one embodiment of this invention.

On the drawings:

Figure 1 is a side elevational view of a tractor and an implement secured together by an implement hitch provided with the guide of the present invention;

Figure 2 is an exploded elevational view of an implement hitch link attachment means provided with a guide of the present invention;

Figure 3 is a sectional view, with parts shown in elevation, taken along the plane 3—3 of Figure 1;

As shown on the drawings:

Figure 4:
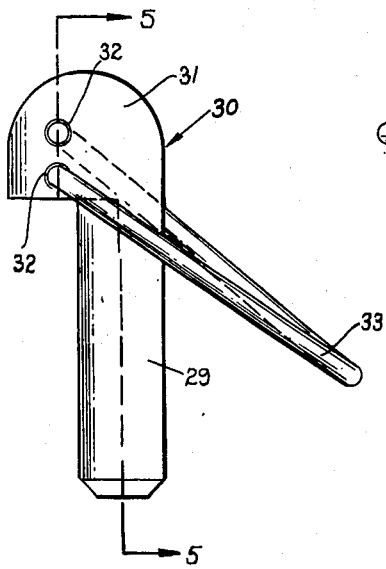
Figure 4 is a side elevational view of a linch pin employed in conjunction with a hitch guide of the present invention.

In Figure 1, reference numeral 10 refers generally to the rear portion of a tractor of well-known make provided with a pair of rearwardly extending hitch link elements 11 pivotally attached, as at 12, to a tractor rear axle housing 13. The links 11 are power-liftable through a pair of laterally spaced hydraulically actuated lift arms 14 attached to the link elements 11 through members 15, as is well-known in the art. A top link 12 is also provided to project rearwardly from the tractor 10, the top link being connected, as at 17, to an upper portion of an implement A-frame forming a portion of an implement 19, such as a plow.

The link elements 11 are provided at their rear ends with open topped notches 20 which are adapted to receive therein generally spherical link attachment bearings 21, telescopically received by the conventional attachment pins 22 guided by the implement cross shaft 23. The implement attachment pins 22 also project through central openings 24 formed in a pair of substantially identical, generally frusto-conical guide plates 25 positioned on opposing sides of the attachment bearings 21, as best shown in Figures 2 and 3. The plates are each provided with a central circular portion 26 lying immediately adjacent the bearings 21 and with peripheral generally conical lips 27 flaring outwardly from the central portions 26 of the plates and directed laterally away from the centrally disclosed bearing 21.

Figure 5:
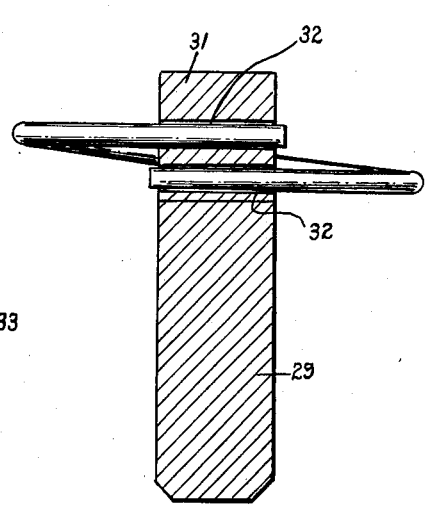
Figure 5 is a sectional view, with parts shown in elevation, taken along the plane 5—5 of Figure 4.

The laterally projecting implement pins 22 are provided with a generally vertically extending aperture 28 adjacent the lateral extremities and adapted to receive therethrough a linch pin 30, best illustrated in Figures 4 and 5. The linch pins 30 generally comprise a stem 29 of generally cylindrical contour and of substantially the same diameter as the apertures 28 and an enlarged head 31 provided with transverse vertically spaced bores 32 within which are received the terminal overlapping ends of a split-type, generally circular spring 33. The diameter of the circular ring defined by the spring 33 is greater than the length of the stem 29 of the associated linch pin so that the spring is resiliently movable beyond the stem 29 to abut the adjacent surface of the portion 26 of the adjacent one of the guide plates 25.

It will be noted that the length of the implement pin 22 upon which the plates 25 and the bearing 21 are disposed is substantially greater than the corresponding combined dimensions of the plates and the bearing. Thus, the plates and the bearing are loosely mounted upon the pin and the plates and bearing may be moved longitudinally of the pin. However, the spring 33 of the associated linch pin retains the plates 25 snugly against opposing sides of the bearing 21 for a purpose to be hereinafter more fully described, and any relative lateral movement of the plates and the pins takes place against the bias of spring 33.

Referring again to Figure 1, the link 11 carrying longitudinally movable latch members 35 at their rear ends and which are urged rearwardly by springs 36 as more fully described and claimed in the pending application, Serial No. 296,386, filed June 30, 1951, by myself and Emery E. Kuhary.

During attachment of the implement to the tractor, the latch member 35 abuts the bearing 21 and upon backing the tractor into the implement, the latch is shoved forwardly against its associated spring 36 to open the notch 20. Upon elevation of the links 11, the bearings enter the slots 20 and the latch 35 is returned to its position in Figure 1, by the spring 36 with the guide plates 25 serving to laterally position the balls 21 within the notches 20.

Figure 6:
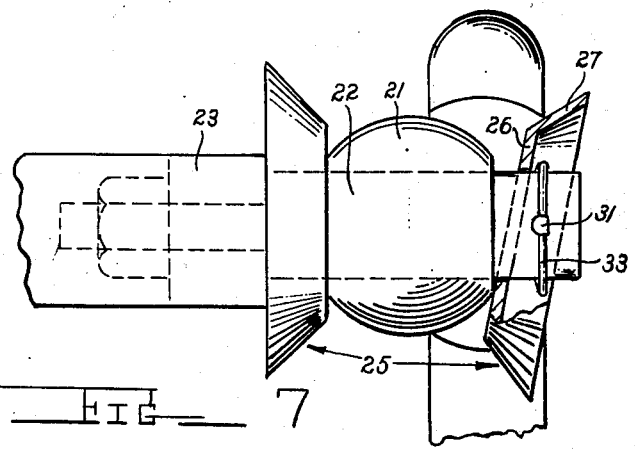
Figure 6 is an enlarged view similar to Figure 3, with parts broken away and in section, and illustrating the attachment guide elements in an adjusted position.
Figure 7:
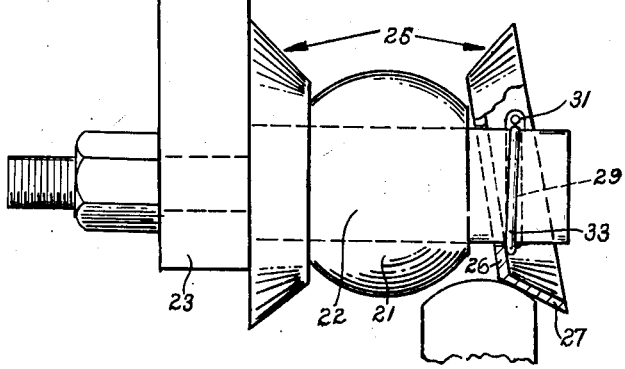
Figure 7 is an enlarged view similar to Figure 6 illustrating the guide elements in another adjusted position.

If the links are laterally misaligned with the attachment bearings, the loosely fitting plates may be laterally cocked to the position of Figure 7 with the springs 31 accommodating such cocking of the plates so that the guide plates are still effective to direct the link ends toward the attachment bearings 21. Similarly, upon vertical misalignment, one of the bearing plates may be moved to a position such as that illustrated in Figure 6 with the spring 33 again accommodating such movement.

Thus, it will be appreciated that the present invention provides an improved implement hitch guide including a spring urged guide plate for directing an associated tractor link onto a link attachment bearing by the resilient accommodation of guide plate movement.

It will, of course, be understood that various details of construction may be varied through a wide range without departing from the principles of this invention and it is, therefore, not the purpose to limit the patent granted hereon otherwise than necessitated by the scope of the appended claims.

I claim:

1. An implement hitch guide adapted to direct a self-locking link element onto a link attachment bearing disposed on a laterally projecting pin comprising a generally convexo-concave plate having a generally frusto-conical outer lip, said plate being adapted for disposition on said pin with the convex side thereof immediately adjacent said bearing and the plate lip protecting therefrom, a securing pin adapted to abut the concave face of said plate to extend thereacross inwardly of said lip in engagement with said lateral pin to retain said plate thereon, and a linch spring carried by said pin and engaging said plate inwardly of said lip to bias said plate toward said bearing.

2. In a link attachment for an implement hitch having an attachment bearing mounted on a cylindrical bearing pin, a hitch link guide comprising a generally convexo-concave guide plate having a central circular portion for abutting said bearing to extend substantially radially of said pin and a frusto-conical outer lip projecting from said bearing and encircling an adjacent portion of said bearing pin, and a linch pin projecting through said bearing pin to secure said plate thereto and having a split circular spring resiliently abutting said central plate portion and encompassed within said lip to urge said plate toward said bearing.

3. A link attachment for an implement hitch comprising a laterally extending mounting pin, an attachment bearing encircling a portion of said pin, guide plates mounted on said pin on opposing sides of said bearing and each having an outwardly deflected generally frusto-conical lip providing a guide surface extending toward said bearing, said mounting pin having a radial aperture therethrough enclosed within the lip of one of said guide plates, a locking pin extending through said mounting pin aperture immediately adjacent the associated guiding plate, and a resiliently deflectible split circular spring carried by said locking pin and engaging said associated plate to resiliently confine said bearing between said plates and to accommodate plate deflection from said bearing.

4. In an implement hitch for a tractor having a trailing draft link, a laterally extending attachment bearing structure adapted to receive said draft link thereon and including a mounting pin having an aperture therethrough adjacent the outer end thereof, a linch pin insertable into said aperture to project transversely beyond said attachment pin, and a split circular spring having its free ends retained by said linch pin and an arcuate bail of greater diameter than the length of said linch pin, said bail being resiliently biased past said linch pin into contact with said attachment bearing structure to resist displacement of said linch pin.

5. An implement hitch for attaching a tractor draft link to an implement, comprising an attachment bearing structure pivotally interconnecting the link and the implement and including a mounting pin on the implement having an aperture adjacent the other end thereof, said pin being adapted to receive said link thereon, a linch pin insertable into said aperture to project transversely beyond said mounting pin, and a split circular spring having its free ends retained by one end portion of said linch pin and an arcuate bail of greater diameter than the effective length of said linch pin, said bail being resiliently biased beyond the other end portion of said linch pin into contact with said attachment bearing structure to resist displacement of said linch pin from said aperture.

References Cited in the file of this patent

UNITED STATES PATENTS

| Number | Name | Date |
| --- | --- | --- |
| 1,240,818 | Buller | Sept. 25, 1917 |
| 2,405,980 | Sands et al. | Aug. 20, 1946 |
| 2,525,505 | Wiedman | Oct. 10, 1950 |
| 2,446,584 | Green | Aug. 10, 1948 |